April 13, 1965   H. J. DE BRUIN   3,177,741
WIRE STRIPPER
Filed April 20, 1962   2 Sheets-Sheet 1
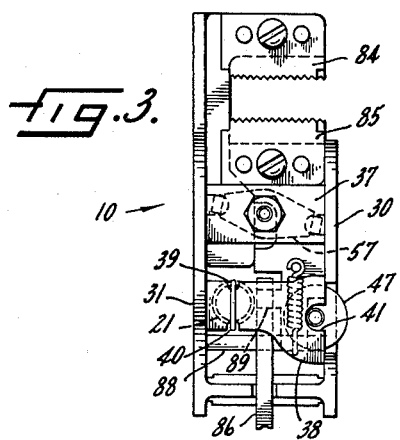
fig.3.
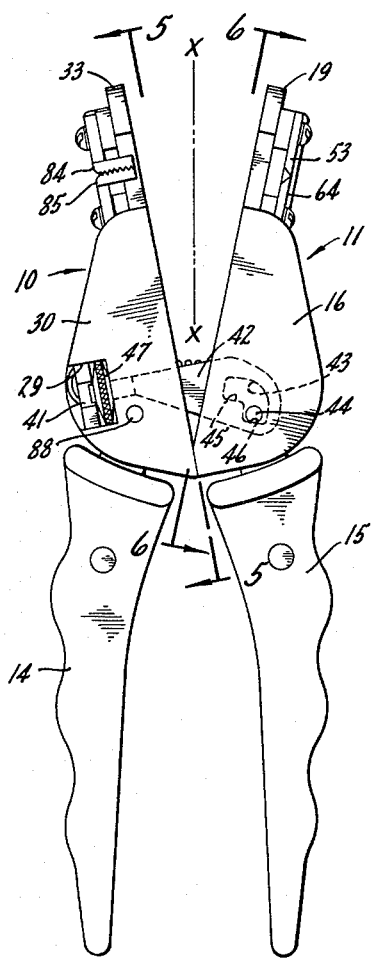
fig.2.
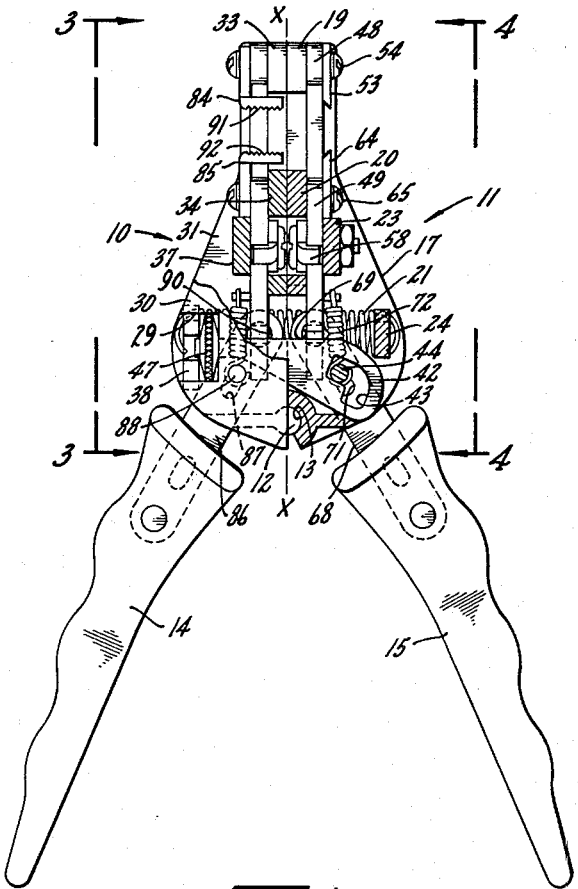
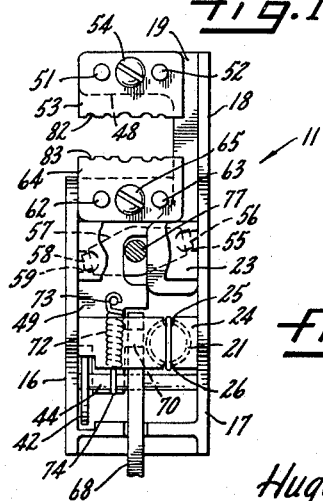
fig.1.
fig.4.
INVENTOR.
Hugo J. deBruin,
BY Parker & Carter
Attorneys.

April 13, 1965   H. J. DE BRUIN   3,177,741
WIRE STRIPPER

Filed April 20, 1962   2 Sheets-Sheet 2

INVENTOR.
Hugo J. de Bruin,
BY Parker & Carter
Attorneys.

United States Patent Office 3,177,741
Patented Apr. 13, 1965

3,177,741
WIRE STRIPPER
Hugo J. de Bruin, Esmond, Ill., assignor to Ideal Industries, Inc., Sycamore, Ill., a corporation of Delaware
Filed Apr. 20, 1962, Ser. No. 189,046
6 Claims. (Cl. 81—9.5)

This invention relates to a wire stripper for covered electrical conductors and the like, and particularly, a wire stripper with improved cutting and stripping mechanism.

An object of this invention is a wire stripper in which matching cutting blades and gripping blades move in a common plane.

Another object is a wire stripper having upper and lower movable carrier blades in each frame member of paired separable frame members.

Another object is a wire stripper wherein the extreme separation of separable frame members is adjustably limited.

Another object is a wire stripper wherein the upper and lower blade carriers simultaneously move together when actuated.

Another object is a wire stripper in which gripping jaws on carriers in one frame member and cutting elements on carriers in the other frame member close on a common centerline to prevent damage to metal conductors from scraping by the cutting elements.

Another object is a wire stripper wherein the stripping action will not bend wire which has varying thickness of insulation cover.

Another object is a wire stripper in which a rocker arm is registered with upper and lower movable blade carriers so that when the lower carrier is raised the upper carrier is simultaneously lowered.

Another object is a wire stripper in which an actuating link moves a lower blade carrier by slidably engaging a fixed point.

Another object is a wire stripper in which frame members are separable about a male and female casting.

Another object is a wire stripper in which the separable frame portions are biased towards each other by an internally placed spring to permit pivotal separation about corresponding male and female castings.

Another object is a wire stripper having a transverse latch with one end secured about a fixed point in one separable frame member and the other end in the other frame member associated with means to vary the length of the latch.

The foregoing objects together with other objects are achieved by the invention which will be described in detail and which is illustrated in the accompanying drawings wherein:

FIGURE 1 is a side elevation view of the wire stripper with parts in section showing the separable frame members in closed or inactive position, FIGURE 2 is a side elevation view showing the separable frame members in open or active position.

Figure 5:
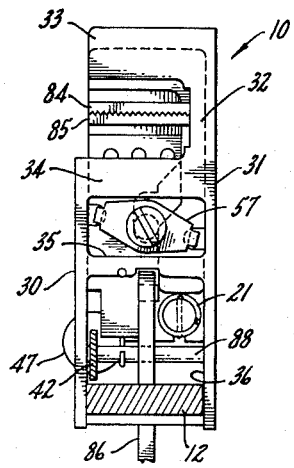
Figure 6:
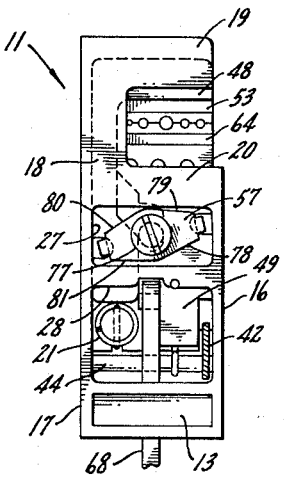
Figure 8:
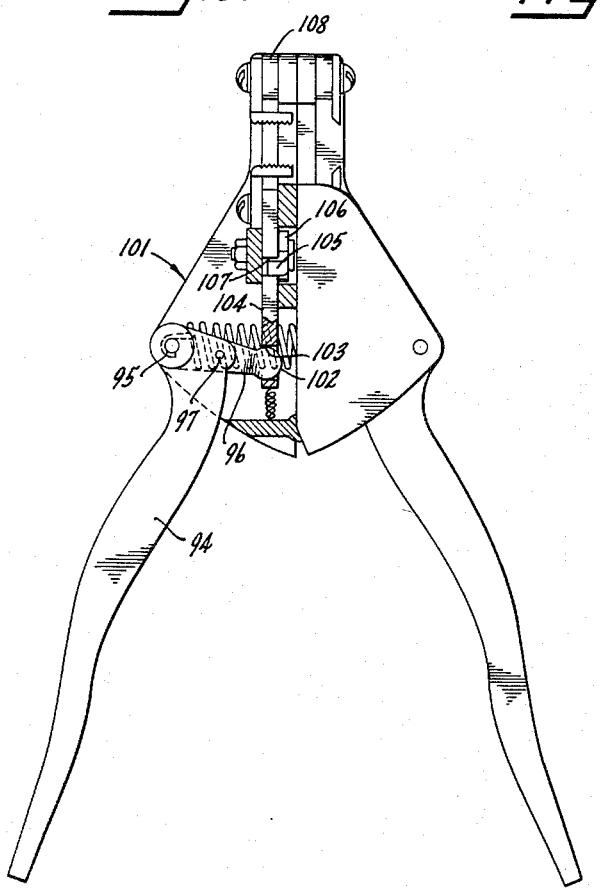
Figure 7:
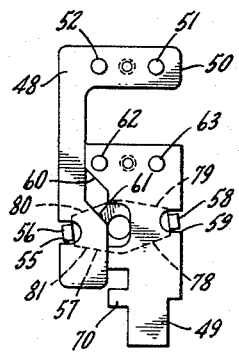

FIGURE 3 is a view along line 3—3 of FIGURE 1.
FIGURE 4 is a view along line 4—4 of FIGURE 1.
FIGURE 5 is a view along line 5—5 of FIGURE 2.
FIGURE 6 is a view along line 6—6 of FIGURE 2.
FIGURE 7 is a detail showing a side view of the carriers in operating relationship, and
FIGURE 8 is a side elevation view of a modified embodiment with an alternate actuating link.

The same structures will have the same reference numerals in the various views unless otherwise indicated.

The wire stripper shown in FIGURE 1 has separable frame members generally shown as 10, 11 which separate along a center line $x$—$x$ about a pivot shown here as consisting of a rounded male protuberance 12 on frame member 10 and coacting female groove 13 on frame member 11. The frame members are separated by moving handles 14 and 15 towards each other. Separable member 11 carries cutting blades 53, 64 and member 10 carries gripping blades 84, 85 adapted for respectively cutting and holding the insulation cover of electrical conductors and the like.

The frame member 11 has a front wall 16 and a back wall 17 which continues into an upper extension 18 to which top lateral wall 19 may be integrally joined. Top lateral wall 19 is along the center line $x$—$x$ of the wire stripper and is spaced from a transverse wall segment 20 which is shown as joining front wall 16 to back wall 17.

Cut-out portions 27 and 28 and female groove 13 are shown on the inside view of the frame portion 11 (FIGURE 6). The outside of frame member 11 is shown to have band 23 and band 24 joining front wall 16 and back wall 17. Band 24 has slots 25 and 26 to receive and anchor one end of a coil spring 21 which urges frame member 11 towards frame member 10. Frame member 10 also has a front wall 30 and a back wall 31 which is modified into an upper extension 32 to which is preferably joined in integral relation top lateral wall 33. Top wall 33 is also aligned along the center line $x$—$x$ and is spaced from transverse wall segment 34. Cut-out portions 35 and 36 and male tubular projection 12 are shown on the inside of frame member 10 (FIGURE 5). The outside has bands 37 and 38 joining front wall 30 and the back wall 31. Band 38 has anchoring slots 39 and 40 to receive the other end of a coil spring 21.

Connecting band 38 has slot 41 which receives the threaded annular end of a latch 42. The front wall 30 of frame member 10 has a cut-out portion 29 to permit knurled nut 47 engaging the annular threaded end to project out of the frame member 10 for manipulation as will be described later. The latch 42 extends transversely across both frame members and a cam slot 43 in the other end of the latch is adapted to engage a rollpin 44 which is fixed to the opposed front wall 16 and back wall 17 of frame member 11.

Each frame member has an upper blade carrier and a lower blade carrier which move towards each other when actuated. In frame member 11, upper movable blade carrier 48 slides alongside back wall extension 18 and top lateral wall 19. The lower blade carrier 49 slides along the front wall 16 of the frame member, transverse wall segment 20 on the inside of the frame member and other portions on the inside of the frame member.

As seen in FIGURE 7, upper blade carrier 48 has a lateral segment 50 which may have projecting lugs 51, 52 to engage aligned apertures in lower cutting blade 53. A screw or the like 54 secures the upper cutting blade to the lateral segment 50 of the carrier. A slot 55 engages a bent tab at one end of a rocker arm 57. The other end of rocker arm 57 has a bent tab 58 which engages slot 59 in the lower carrier 49. The lower carrier has an edge 60 sloping at 45 degrees from the vertical which is adapted to engage complementary slope 61 of the same angle in the upper carrier when both carriers are moved towards engagement. The lower carrier likewise may have lugs 62, 63 adapted to fit aligned apertures in lower blade 64. A screw or the equivalent 65 may be used for fixing the lower blade onto the lower carrier.

The lower blade carrier in frame member 11 is moved, that is, raised, by an actuating link 68 which has an eyelet 69 at one end engaging projection 70 on the lower carrier 49. A longitudinal slot 71 in link 68 is seated around rollpin 44 which is fixed between front wall 16 and back wall 17 of frame member 11. The other end of link 68 is fixed in handle 15. When handle 15 is moved towards handle 14, the slot 71 rides on rollpin 44 until the rollpin sits at the bottom of the slot. This action moves the link and the lower carrier upwards. The lower carrier is normally urged downwards by spring 72 fixed to the lower carrier at 73 and to, say, the rollpin at 74. The upward movement of the lower carrier 49 pivots rocker arm 57 about pivot point 77, and bent tab 56 in slot 55 of the upper carrier simultaneously causes the upper carrier 48 to be lowered.

The pivoting or rocking of rocker arm 57 occurs in cut-out portion 27 of separable frame member 11. The rocker arm has sides 78 and 79 which slope towards each other at one end and sides 80 and 81 on the other end which slope in a similar manner. When the carriers are not actuated, sides 78 and 80 are closely situated to the opposite sides of cut-out portion 27. When the carriers are actuated, then sides 79 and 81 become closely situated towards the opposite side of the cut-out portion and sides 78 and 80 are spaced therefrom.

When the cutting blades are in fully closed position, matching notches such as 82 in the upper blade 53 and matching notches 83 in the lower blade 64 meet to form circular cutting surfaces as shown.

Separable frame member 10 has a similar arrangement of an upper carrier, a lower carrier, an actuating link, a rollpin and a rocker arm. In place of the cutting blades, frame member 10 has an upper gripping blade or angle 84 fixed to the upper movable carrier and a lower gripping blade or angle 85 fixed to the lower movable carrier. The actuating link 86 is shown as having a similar longitudinal slot 87 slidably engaging rollpin 88 which is fixed to the back and front walls 30 and 31 of frame member 10. Link 86 has an eyelet 90 which engages a projection 89 on the lower movable carrier.

Gripping blades 84 and 85 are in the shape of an angle, that is, both have lateral portions 91 and 92 which are generally parallel to each other. The surfaces of the portions 91 and 92 are cross-hatched, striated or otherwise broken to provide a good gripping surface when the covered wire is placed therebetween in gripping relationship.

The degree to which frame member 11 may be separated from frame member 10 by moving the handles 14 and 15 towards each other is controlled by latch 42 which transversely extends to both frame members. When the frame members 10 and 11 are closed by abutting each other on the center line x—x, as shown in FIGURE 1, rollpin 44 sits on raised surface 45 of cam slot 43. When the frame members are separated, rollpin 44 falls to lowered surface 46 and further separation of the frame members is prevented. The length of latch 42 can be varied by working the knurled nut 47 to move the threaded annular end of the latch further beyond the nut, or in the other direction as it may be desired.

The actuating links 68 in handle 15 and 86 in handle 14 have been shown to raise the lower blade carriers through a slot in said links sliding over the rollpins. Other equivalent means may be devised for raising the lower carriers and one such alternate linkage is shown in FIGURE 8. The actuating linkage is shown on one side since the other side is substantially identical in structure and operation.

Handle 94 is pivoted at 95 and transverse arm 96 pivots at one end at 95 and is fixed at 97 to the handle. The pivot 95 is secured to the front and back walls of separable frame member 101. Transverse arm 96 has a rounded end 102 which is seated in a rounded aperture 103 of lower blade carrier 104. Bent tab 105 of rocker arm 106 rides in slot 107 of carrier 104. A bent tab is on the other end of the rocker arm and sits in a slot of upper carrier blade 108. When handle 94 is moved towards the other handle, it will pivot at 95 and raise arm 96 and lower carrier 104 seated thereon. Movement of the lower carrier will simultaneously move rocker arm 106 and cause upper carrier 108 to lower in the same plane with rising lower carrier blade 104. Other equivalent embodiments for actuating the lower carrier are possible.

The use and operation of my invention are as follows:

A given stripping operation may require that only a predetermined length of insulation cover be removed from an electrical conductor. If, for example, only a small length of insulation cover or slug is to be removed in a given series of stripping operations, then it is only necessary that the separable frame members move apart a limited degree. Accordingly, the knurled nut 47 is manipulated to shorten the length of the latch 42 so that the extreme separation of the frame members is appropriately limited.

The wire stripper is initially in a closed or inactive position, that is, the frame members abut each other along a center line x—x as shown in FIGURE 1, and both the gripping blades and the cutting blades are separated on their respective carriers. An electrical conductor is placed between one of the notches 82 and 83 in the cutting blades 53 and 64 so that circular cutting surfaces are formed when the blades move together. An appropriate cutting surface is selected for a given diameter of an electrical conductor.

Handle 15 is then moved towards handle 14 and articulating link 68 slides over rollpin 44 in a generally upward direction. The other end of the actuating link is engaged with projection 70 on the lower movable carrier 49, and the carrier is raised, which motion moves the bent tab 58 engaged in slot 59 of the lower movable carrier. The bent tab causes rocker arm 57 to pivot about its pivot point and thereby move the upper movable carrier 48 downwards. The foregoing action causes the upper carrier to be simultanueously lowered in a common plane with the lower carrier. The cutting notches 82, 83 in the upper and lower blades meet and form a circular cutting surface which cuts into the insulation cover of the electrical conductor.

By moving handle 14 inward, articulating link 86 is raised in a similar manner, that is, longitudinal slot 87 in the link slides over rollpin 88 fixed between the front and back walls of frame member 10. This link raises the lower movable carrier in frame portion 10 which, in a manner similar to that described for frame member 11, moves a rocker arm which simultaneously moves or lowers the upper carrier in a common plane with the lower carrier. Upper movable carriers of frame member 10 carry gripping blades 84, 85 which come together and grip the insulation cover of an electrical conductor. The carriers in the two frame members close about a common centerline which is an advantage because the metal conductors will not be damaged as might occur by cutting blades scraping the conductor in strippers of different alignment. It will also be realized that the relationship of the carriers in the frame members will permit wires to be stripped without bending the wire, regardless of the thickness of the wire.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A wire stripper for removing the insulation cover from electrical conductors which includes, in combination, a pair of separable frame members pivoted together, means to open and close said frame members about a pivot, a spring urging said frame members towards a closed position, each frame member having an upper movable blade carrier, a lower coacting coplaner movable blade carrier, means for actuating the lower carrier blade towards the upper carrier blade, a spring urging the lower blade carrier downwards, a rocker arm having one end registered with the upper blade carrier, the other end registered with the lower blade carrier, a pivoted portion intermediate said ends, and means to move the lower carrier upwardly whereupon the rocker arm moves the upper carrier with the lower carrier in a common plane.

2. A wire stripper as in claim 1 further characterized by and including a latch of adjustable length having one end movably engaged in means to adjust the length and the other end having a cam slot coacting with a fixed point, whereby the extreme separation of said frame members is limited.

3. A wire stripper for removing the insulation cover from electrical conductors which includes, in combination, a pair of separable frame members pivoted together, a spring transversely connected to each frame member and urging said frame members towards a closed position, each frame member having an upper blade carrier, a lower coacting coplaner blade carrier, an actuating link connected at one end to the lower blade carrier, the other end adapted to be actuated and an intermediate portion slidably coacting with a rollpin fixed to each frame member, a spring urging the lower blade carrier downwards, a rocker arm having a lateral projection at one end registered with the lower blade carrier and a lateral projection at the other end registered with the upper blade carrier, said rocker arm centrally pivoted about a fixed point, one frame member having upper and lower cutting blades with matching notches fixed to the respective carriers, the other frame member having upper and lower gripping blades with parallel gripping surfaces fixed to the respective carriers, a latch of adjustable length transversely extending to both frame members, said latch having one end in one frame member fixed to adjustable means to vary its length, and the other end having a cam slot engaging the rollpin fixed to the other frame members, whereby the cutting and gripping blades move in a common plane along the center line of the closed frame members and whereby the extreme separation of the separable frame members is limited.

4. In an insulation stripping tool, a pair of frame members pivoted together, a spring urging the frame members to closed position, a pair of handles operatively connected to the frame members so that when the handles are manually manipulated the frame members will open and close, a pair of gripping jaws on one frame member, each being movable toward and away from the other in a common plane by a connecting link so that they perform an opening and closing action, a pair of cutting jaws on the other frame member, each being movable toward and away from the other in a common plane by a second connecting link so that they perform an opening and closing action, a connection between the jaws and the handles so that manipulation of the handles opens and closes the jaws by moving the cutting jaws and the gripping jaws and thereby actuating their associated connecting links, a stop on the tool between the levers for limiting the extreme of pivotal separating of the levers, and means for adjusting the stop to vary the extreme of pivotal separation of the levers.

5. The structure of claim 4 further characterized in that the stop includes a latch, and further including means for releasing the latch in response to return movement of the handle.

6. A wire stripper as in claim 1 further characterized in that one set of upper and lower carriers has cutting knives with notches along their edges for cutting the insulation from electrical conductors, and the other set of upper and lower carriers have gripping surfaces for gripping the insulation cover of the electrical conductors.

References Cited by the Examiner

UNITED STATES PATENTS

| | | |
|---|---|---|
| 1,618,734 | 2/27 | Smitak. |
| 1,675,838 | 7/28 | Bernard. |
| 2,313,793 | 3/43 | Wood. |
| 2,523,936 | 9/50 | Axelsen. |
| 2,886,995 | 5/59 | Bach et al. _____ 81—9.51 |
| 2,995,051 | 8/61 | Redway. |
| 3,003,375 | 10/61 | Hopkins _____ 81—9.51 |
| 3,021,738 | 2/62 | Anderson et al. |

FOREIGN PATENTS

| | | |
|---|---|---|
| 77,583 | 6/33 | Sweden. |
| 780,257 | 1/35 | France. |

WILLIAM FELDMAN, *Primary Examiner.*

MILTON S. MEHR, *Examiner.*